United States Patent [19]

Earman et al.

[11] Patent Number: 4,594,701
[45] Date of Patent: Jun. 10, 1986

[54] SYSTEM FOR RECORDING DATA ON SPIRAL TRACK

[75] Inventors: Allen M. Earman, Burlington County, N.J.; James Y. Higashi, King County, Wash.

[73] Assignee: RCA Corporation, Princeton, N.J.

[21] Appl. No.: 547,039

[22] Filed: Oct. 31, 1983

[51] Int. Cl.⁴ .............................................. G11B 7/00
[52] U.S. Cl. ...................................... 369/43; 369/44; 369/33; 369/111; 358/342; 360/72.1
[58] Field of Search ............... 358/342, 344, 345, 348, 358/347; 369/32, 43, 44, 47, 33, 109, 111, 115, 125, 96, 93, 50; 360/55, 72.1

[56] References Cited

U.S. PATENT DOCUMENTS

| | | | |
|---|---|---|---|
| 4,097,895 | 6/1978 | Spong | 358/128 |
| 4,138,663 | 2/1979 | Lehureau et al. | |
| 4,142,209 | 2/1979 | Hedlund et al. | 358/128 |
| 4,321,635 | 3/1982 | Tsuyuguchi | 369/32 |

Primary Examiner—Robert L. Richardson
Attorney, Agent, or Firm—Joseph S. Tripoli; Robert L. Troike; Christopher L. Maginniss

[57] ABSTRACT

An apparatus and method are disclosed for piecemeal recording of data on an optical disc using a spiral track format without the necessity of leaving a guard band between recordings or even providing a leader on the subsequently recorded track. A new recording is added to the end of a previously recorded track by first playing back the previous track. The tracking servo is locked to the data track and the translation stage motion is adjusted to match the spiral rate of the track. As the end of the previous track is approached, the translation stage drive is switched to a constant dc drive, the tracking servo is disabled, the tracking mirror is electronically locked to a nominal position, and the new recording begins. This operation may be repeated for each new data file to be recorded in piecemeal fashion.

18 Claims, 12 Drawing Figures

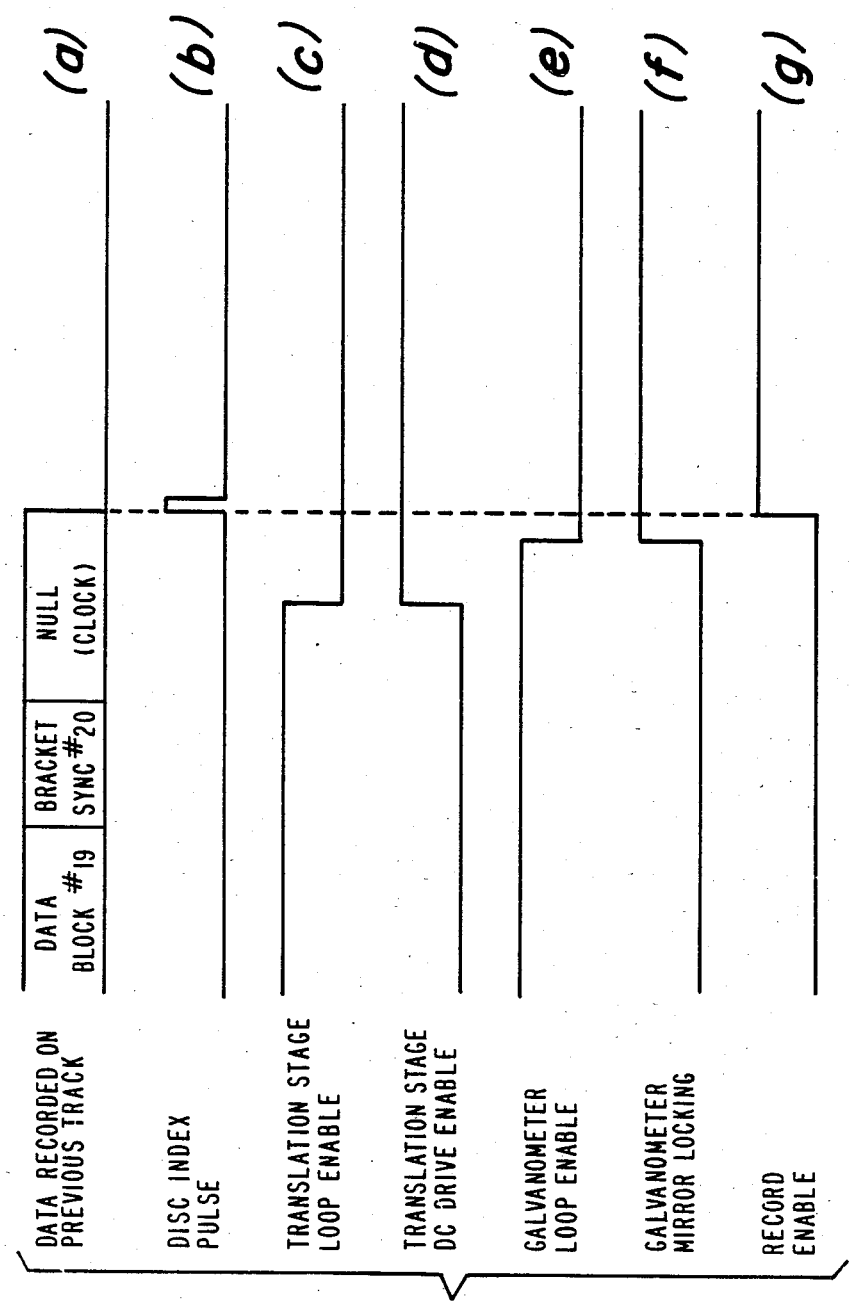

SYSTEM FOR RECORDING DATA ON SPIRAL TRACK

The present invention relates generally to optical disc recording systems and, more particularly, to an apparatus and method for increasing data density in spiral track format when recording in a noncontinuous mode.

In optical disc records of the type described in U.S. Pat. No. 4,097,895, "Multilayer Optical Record," issued June 27, 1978, to Fred W. Spong, and assigned to the same assignee as the present invention, the light output of a recording beam, which is intensity modulated in accordance with a signal to be recorded, is focused upon a surface of the disc as the disc is rotated. With the peak intensity of the focused light sufficient to cause ablation of an absorptive layer coated over the disc surface, an information track is formed as a succession of pits in the absorptive layer. In playback of such disc records, a light of a constant intensity, insufficient to cause further ablation of the absorptive layer, is focused on the information track. A photodetector, positioned to receive light reflected from the information track which is modulated in intensity by the pits' passage through the path of light, develops a signal representative of the recorded information.

An optical disc record is provided with one of two data track formats. One format comprises concentric tracks which are used preferably to record, for example, a block of information such as a single frame of a television signal. Concentric track format has long been used in the magnetic disc computer peripheral industry, as it provides data blocking simplicity and, through constant track separation, relatively high data density for small files, i.e., less than or equal to one concentric track. The major disadvantage of concentric track format is that for file lengths greater than one track there is a gap in the data stream while the playback head, comprising the light-focusing lens and photodetector, is repositioned to the adjacent track. For continuous output data, the internal data rate must be increased and the data must be buffered to conceal the gap in the data stream.

The second track format is the continuous or spiral track which traditionally serves as the medium for continuous action of video information, and has not generally been used to record blocks of digital data. Both types of consumer video disc player, optical and CED, employ the spiral track format. This format is ideally suited for very long data files since there is no gap in the data stream and since the track separation may be minimized, thereby increasing the data density. The major disadvantage arises when short files are recorded. A spiral track requires a leader on which to acquire since, unlike the closed concentric format, there is only one chance to retrieve data. This leader typically may occupy a length of track corresponding to one to two disc rotations. In addition, once the recordation of a data file in spiral format has been completed, a radial space, or guard band, with no recorded data must be left before starting a new spiral track. This space accommodates disc wobble which results in eccentric tracks, and typically occupies the space of ten tracks. It is therefore seen that the track leader and guard band consume useful area of disc surface and severely reduce data density.

Prior systems, such as the one described in U.S. Pat. No. 4,142,209, "Disc Track Servo System," issued Feb. 27, 1979, to Lee V. Hedlund et al. and assigned to the same assignee as the present invention, have improved data density in noncontinuous (or piecemeal) recording modes by reducing the size of the guard band. The Hedlund et al. patent, for example, discloses an apparatus for making piecemeal recordings with guard bands which are less than possible variations caused by eccentricity errors. Hedlund et al. does this by recording a signature waveform of the physical shape or profile of an information track recorded adjacent to the unrecorded area of the disc, and applying that waveform to the electronics controlling the position of the recording head when a subsequent information track is recorded.

The present invention provides an apparatus and method whereby piecemeal recordings may be made on an optical disc record employing the spiral track format, wherein the placement of a subsequent information track abuts the previously recorded information track without the requirements of either a radial space between tracks or a track leader on the subsequent information track.

In accordance with the principles of the present invention, an apparatus is disclosed for use in an information recording and playback system including a disc-shaped record medium having a convolution of spiral track recorded on a surface thereof, the convolution having recorded information stored thereon, and further having an unrecorded region of the surface abutting one end of the convolution. The apparatus permits a subsequent recording to be made in the unrecorded region and comprises means for rotating the record medium and transducer means for detecting the information stored in the convolution. The apparatus additionally includes means for generating an error signal representative of the position of the transducer means relative to the convolution and means for effecting radial motion of the transducer means relative to the convolution. Switch means selectively apply, in a first position, the error signal to the means for effecting radial motion and, in a second position, a dc voltage level to the means for effecting radial motion. A switch control means is coupled to the transducer means and responds to the information stored in the convolution so as to place the switch means from the first position to the second position when the transducer means detects information stored near the end of the convolution abutting the unrecorded region. Finally, the apparatus includes means responsive to the end of the convolution for initiating recording on the unrecorded region abutting the convolution.

Other features and advantages of the present invention will be more fully understood from the following detailed description of the preferred embodiment, the appended claims, and the accompanying drawings, in which:

FIGS. 1(a) and 1(b) illustrate prior art noncontinuous recording techniques using concentric and spiral track formats, respectively;

FIG. 5 consisting of (a)–(g) is a series of timing charts useful in explaining the operation of the embodiment of FIG. 4.

Figure 1A:
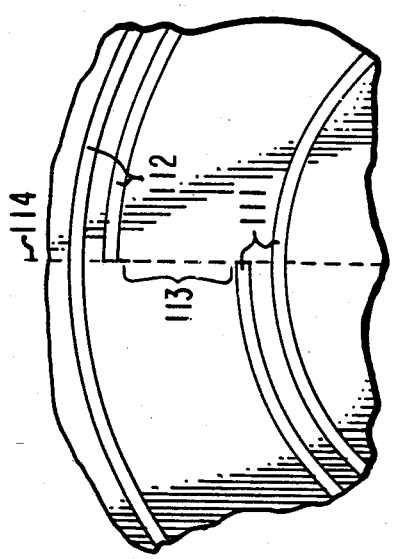

FIG. 1(a) depicts a zone of an optical disc recorded in concentric track format. By applying the principles taught in the cited Hedlund et al. patent (U.S. Pat. No. 4,142,209), non-continuous recordings may be made with minimal guard bands. Tracks 101, 102 and 103 may be made on three different occasions, with record and playback head movement over the surface of the disc between the recordings on those tracks. In this format, the data begins and ends at a specified reference position 104 on the disc, typically denoted by an index pulse generated by an optically detected mark scribed on a label affixed to the disc.

Figure 1B:
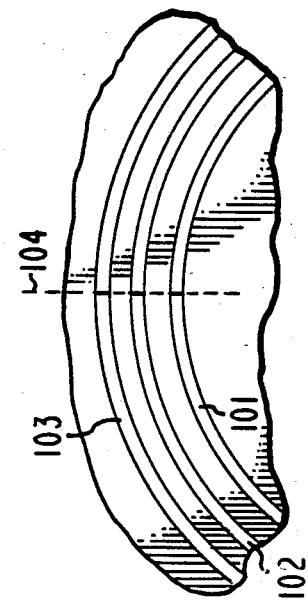

FIG. 1(b) depicts a zone of an optical disc recorded in spiral track format according to the prior art. In this case, track 111 represents the previously recorded track, and track 112 is the subsequently recorded track. Guard band 113 separates the tracks 111 and 112 with an unusable zone equivalent to the width of about ten track spaces. As was noted earlier, the first approximately one to two rotations of track 112 contain a leader on which to acquire. Even when the teachings of the cited Hedlund et al. patent are applied to reduce the guard band 113 spacing, there still remains a discontinuity between tracks 111 and 112 and the need for the leader on track 112. As was the case for the concentric track format, spiral track recordings begin and end at a specified reference position 114 on the disc, indicated by the generation of a disc index pulse.

Figure 2:
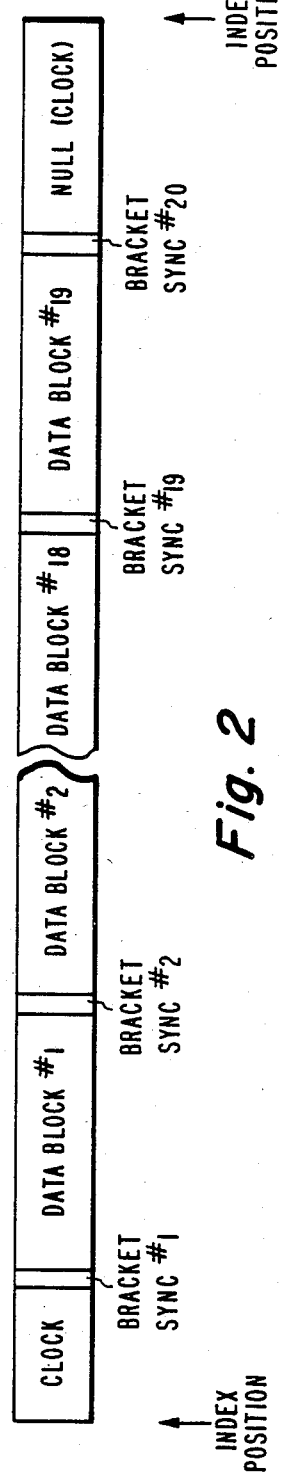
FIG. 2 depicts a typical data formatting scheme used in a single track of either concentric or spiral format recording.

A typical data formatting scheme for use in a single disc convolution in either concentric or spiral format recording is shown in FIG. 2. The convolution includes nineteen blocks of data (or sectors), each of which typically contains 68,096 bits of data. Each data block is preceded and followed by a bracket sync zone, which typically includes 512 bits of clocking information and a unique sync code, a special flag word which causes the controlling processor to recognize the sector address and to sync the digital electronics to the sector phasing arrangement. In addition, the beginning of each convolution, as determined by the index position, typically comprises 5,120 bits of clocking information. Finally, the end of the convolution includes a null area, which contains no meaningful data but which is filled with clocking information, and which typically comprises up to 2,000 bits of information.

Figure 3:
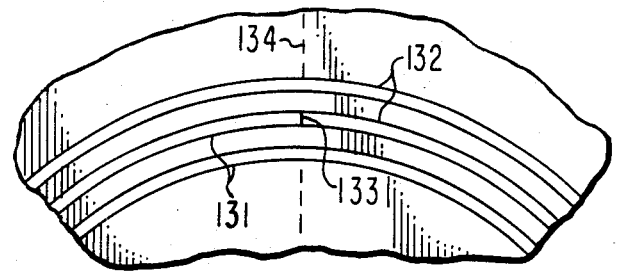
FIG. 3 illustrates noncontinuous spiral track recording according to the principles of the present invention.

FIG. 3 illustrates the technique of non-continuous spiral track recording according to the present invention. The previously recorded information occupies track 131 ending at point 133, which point lies along disc reference position 134. The subsequent information, recorded at a later time, will begin at point 133 and occupy track 132. Hence, the subsequent track 132 will be abutted to the previously recorded track 131, with no guard band and no leader information on the subsequent track 132.

Figure 4:
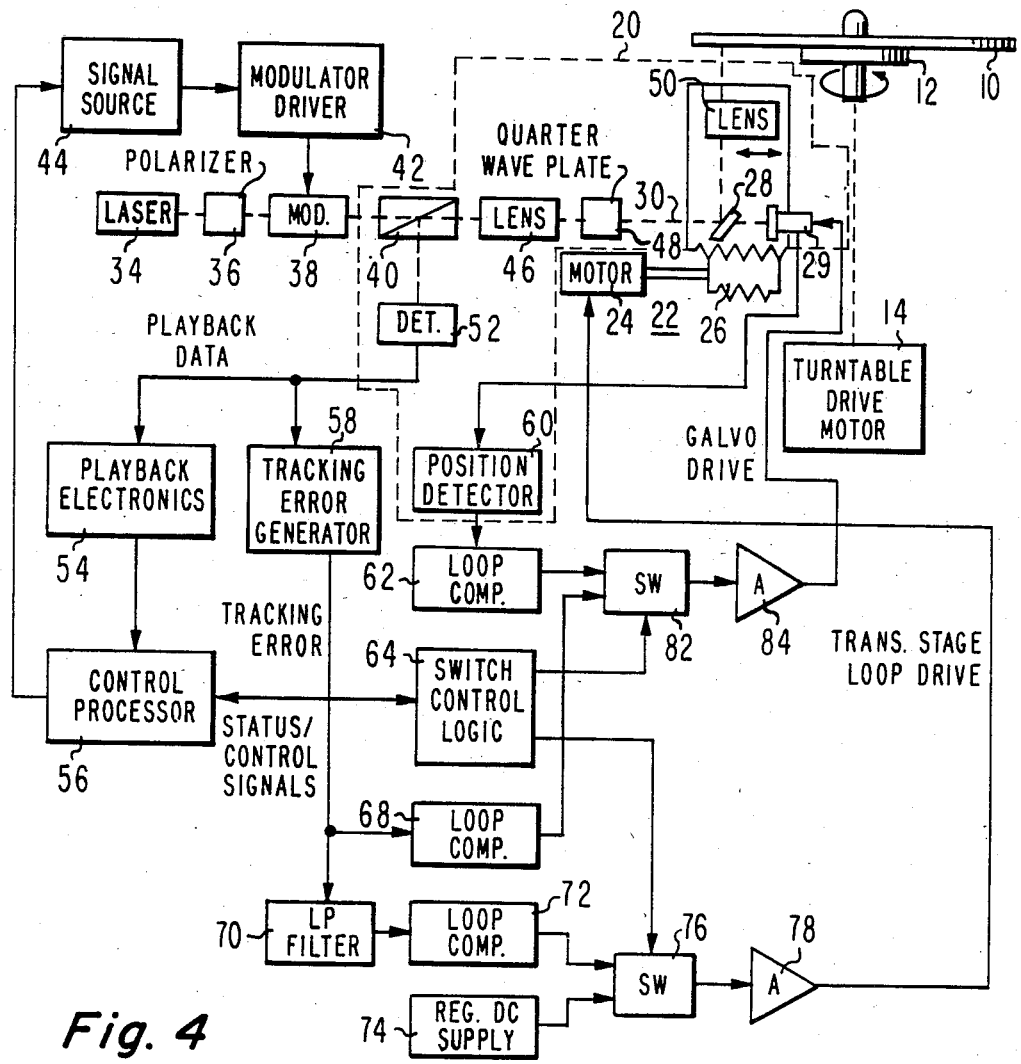
FIG. 4 is a functional block diagram representation of the preferred embodiment of the present invention.

In accordance with the embodiment of FIG. 4, data are stored on precisely located tracks for rapid retrieval. Recordation is achieved on a light sensitive disc into which data are permanently recorded, generally by ablation or melting. The recorded information is available immediately without further processing of any kind.

A disc 10 as illustrated in FIG. 4 is formed having a laser sensitive material providing a surface upon which ablative recording by the thermal effects of a focused laser beam may be made. In the embodiment of the present invention, disc 10 has data recorded only on part of its usable surface. These data have been recorded using the spiral format. In this format adjacent tracks are closely spaced (e.g., on the order of one micrometer).

To provide spiral formatted optical scanning on the surface of disc 10, translation stage 20 is moved radially across disc 10 by transporting means 22 at a rate in accordance with the requirements of the desired recording or playback mode while disc 10 is rotated on turntable 12 by motor 14. Translation stage 20 is a platform bearing elements of the transducer system, namely, beam splitter 40, lens 46, quarter-wave plate 48, galvanometer 29, its mirror 28 and position detector 60, focusing lens 50, and photodetector 52.

Transporting means 22 comprises conventional components including coarse tracking motor 24 and a feedscrew 26 adapted to be rotated in response to rotations of the shaft of motor 24. Feedscrew 26 is in mesh engagement with a bearing surface of stage 20. When motor 24 is activated and the shaft is rotated, for example, in a clockwise direction, feedscrew 26 will cause stage 20 to move radially inward toward the center axis of turntable 12. Furthermore, if the shaft of motor 24 is made to rotate in a counter-clockwise direction, stage 20 will move radially outward. By means of a motor drive signal from translation stage loop driver 78, stage 20 may be moved (i.e., coarse tracking movements) such that the light beam 30 falls on the surface of disc 10 to within a few tracks of a desired track location.

Fine tracking movements may be achieved by deflecting the light beam exactly to a desired track by a conventional galvanometer controlled mirror 28. Galvanometer 29 causes galvanometer controlled mirror 28 to move about an axis that is parallel to the reflecting surface of disc 10 so that a light spot that is formed by lens 50 may be guided along a selected track on disc 10. Mirror 28 is actuated by galvanometer 29 in response to control signals which are supplied by galvanometer driver 84.

In the record mode, the monochromatic light output of laser 34 (illustratively an argon type providing an output wavelength of 488 nanometers) is passed via polarizer 36 and intensity modulator 38 to a polarizing beam splitter 40. The polarizer 36 effects a polarization of the laser output in a direction that permits passage of the intensity modulated light through the beam splitter 40. The intensity modulator 38 is driven by a modulator driver 42, responsive to a data stream source of digital information. The data stream source, which may be pulse code modulated, is furnished by signal source 44 to modulator driver 42 under the control of control processor 56. The light intensity of the output of modulator 38 is shifted between high and low levels in consonance with the pulse code modulated input signal.

A lens 46 forms the light passed by beam splitter 40 into a beam which passes through quarter-wave plate 48 to galvanometer controlled mirror 28 which reflects the beam through a focusing lens 50 onto the absorptive surface layer of disc 10. The absorptive layer in the path of the focused light beam is ablated to form a pit when the light beam intensity level is high. The absorptive layer remains undisturbed when the light beam intensity level is low. The result is formation of an information track of the general type shown in the aforementioned Spong patent.

In the play mode of operation, variations of the intensity of the laser output is discontinued by a suitable disabling of modulation control system 38, 42, and 44. The intensity of the laser output is set at a constant playback level which is safely below the level causing ablation of the material of the absorptive layer. The laser beam follows the previously described path (via elements 36, 38, 40, 46, 48 and 28) to lens 50 which focuses the beam on the desired information track of disc 10. Light reflected from the information track is returned via elements 50, 28, 48 and 46 to the beam splitter 40. Since the return light beam has made two passes through quarter-wave plate 48, its polarization has been altered to a direction which results in reflection of the return light beam by beam splitter 40 onto a device for converting light energy variations into an electrical signal, shown in FIG. 4 as photodetector 52.

The intensity of light falling upon the photodetector 52 alternates between minimum and maximum levels as the successive pit and undisturbed surface regions of the information track pass through the path of the focused beam. The minimum intensity level for light reaching photodetector 52 is obtained when an undisturbed region of the absorptive layer of disc 10 is in the focused beam path, while the maximum intensity level for light reaching the photodetector 52 is obtained when a pit is in the focused beam path.

The output of photodetector 52 comprises pulse code modulated waves which vary in consonance with the pit edge spacing. Variations of the detected beam intensity are representative of the original signal encoded on the disc surface during the recording operation. The data signal provided by photodetector 52 is applied to playback electronics 54 for use by control processor 56; the data signal is also applied to tracking error signal generator 58.

Tracking error signal generator 58 receives the output signal from detector 52 and derives from it an error signal useful in determining the position of translation stage 20 relative to a selected track on disc 10. Circuits such as tracking error signal generator 58 are well known in the art, and are to be found, for example, in U.S. Pat. No. 4,138,663, issued Feb. 6, 1979, to Lehureau et al. Tracking error signal generator 58 also provides compensation for variations in the intensity of radiation emitted by laser 34.

The tracking error signal is applied to a first loop compensation circuit 68 and also to a second loop compensation circuit 72; the latter circuit 72 receives only that portion of the tracking error signal having frequency components which are passed by low pass filter 70. Typically, the cutoff frequency of filter 70 is 10 Hz, so that only the motion of translation stage 20 moving radially across the disc while reading the information recorded in spiral track format is passed to loop compensation circuit 72. Loop compensation circuit 68 typically comprises a low-pass active filter, which passes only the fundamental frequency of the tracking error signal, and a frequency-dependent servo amplifier which compensates for the resonant frequency and the phase shift of galvanometer 29. Loop compensation circuit 72 is typically a frequency-dependent servo amplifier.

Galvanometer 29 includes position detector 60 (shown separately in FIG. 4 for purposes of clearer understanding), which is typically a parallel-plate capacitor. Relative movement of the plates, indicative of movement of mirror 28, varies its capacitance. This variation is used to attenuate a sine wave generated by a local oscillator and thus provides an ac error signal when the light beam deflected by galvanometer controlled mirror 28 is not aligned with the optical axis of focusing lens 50. Loop compensation circuit 62 detects the envelope of the ac error signal and provides a compensation signal that when applied via driver 84 to the galvanometer 29 compensates for resonances in the galvanometer.

Switch 76, which is the functional equivalent of a single-pole, double-throw switch, applies either the output signal of loop compensation circuit 72 or the voltage output from regulated dc supply 74 to the input terminal of translation stage driver 78, under the control of switch control logic 64. Switch 82, which is also the functional equivalent of a single-pole, double-throw switch, couples either the output compensation signal of loop compensation circuit 62 or the output signal of loop compensation circuit 68 to the input terminal of galvanometer driver 84, under the control of switch control logic 64. Despite the functional representations described above, switches 76 and 82 are typically implemented as solid state switches, for example, FET's, in a manner well known to persons skilled in the art.

When operating in the spiral track record mode, switch control logic 64 provides control signals to switches 76 and 82 such that the output voltage from regulated dc supply 74 is applied to the input terminal of translation stage driver 78, which output signal drives translation stage 20 at a uniform rate, and the output signal from loop compensation circuit 62 is applied to galvanometer driver 84. Thus, in this mode, the translation stage 20 is moved radially across disc 10 at a uniform rate while the galvanometer controlled mirror 28 is locked in a null, or straight-up, position with respect to disc 10 via its feedback loop.

When operating in the spiral track playback mode, switch control logic 64 provides control signals to switches 76 and 82 such that loop compensation circuit 72 is coupled to translation stage driver 78 which output signal drives translation stage 20, and loop compensation circuit 68 is coupled to galvanometer driver 84. Thus, in this mode, galvanometer 29 responds to the tracking error signal output of generator 58 due to offset from the recorded track while loop compensation circuit 72 is used to advance or retard movement of translation stage 20 as it follows the previously recorded spiral track.

In accordance with the present invention, a system is disclosed for controlling the movements of translation stage 20 and galvanometer controlled mirror 28 to permit the recording of data in spiral track format, wherein a new data track is abutted to a previously recorded track. Control processor 56 generates a sequence of control signals to switch control logic 64 which cause switches 76 and 82 to drive translation stage 20 at uniform velocity and to align the beam passing through lens 50 with its optical axis just prior to the subsequent recording.

In its operation, the spiral track recording system proceeds as follows. While in the playback mode, with switch control logic 64 commanding switches 76 and 82 to pass the output signals from loop compensation circuit 68 and loop compensation circuit 72, respectively, the last recorded track is detected by photodetector 52 and the data recorded therein are passed by playback electronics 54 to control processor 56. Control processor 56 examines the received data, comparing them with known values, until it determines that the unique data comprising, for example, bracket sync #20 (see FIG. 2) have been received. At this time the final sector of the recorded track, the null sector containing only clocking information, is detected by detector 52 and passed to control processor 56. Entry into the null sector causes control processor 56 to set an internal timer (not shown). When the internal timer indicates that approximately one-half of the null sector has been read, processor 56 commands switch control logic 64 to send a signal to switch 76 causing it to switch from the output of loop compensation circuit 72 to the voltage of the regulated dc supply 74. This causes translation stage 20 to be driven radially with respect to disc 10 at a uniform velocity.

When the internal timer of control processor 56 indicates that approximately nine-tenths of the null sector has been read, processor 56 commands switch control logic 64 to send a signal to switch 82 causing it to switch from the output of loop compensation circuit 68 to the output of loop compensation circuit 62. This has the effect of disabling the tracking function of galvanometer 29 and causing mirror 28 to be positioned so as to deflect beam 30 straight up along the optical axis of lens 50, under the closed-loop control of position detector 60 and loop compensation circuit 62.

Finally, when control processor 56 determines that the index pulse has been detected, it issues a record enable command to signal source 44, modulation control system 38 and 42 is enabled, and data recording on disc 10 begins. Thus, the optical disc record/playback system switches from the playback mode to the record mode during the final instants of the data on the last recorded track, enabling a subsequent recording to be abutted to that data.

FIG. 5 is a series of timing charts which illustrate a typical sequence of events occurring just prior to and during the first moments of the subsequent recording. Although the horizontal scale represents time (moving toward the right), there is no attempt at proportionality and, in fact, the time scale at some places is highly exaggerated for clarity of representation. In each of the timing charts (c) through (g), a high level will represent the true (enabled) state of the captioned signal, and a low level will represent the false (disabled) state.

Timing chart (a) depicts the previously recorded data including data block #19, the final bracket sync and the sequence of clock signals in the final recorded track. Timing chart (b) comprises a pulse representing, at its leading edge, the index position of the disc. During the final sector of the recorded track, containing only clocking signals, the response of translation stage 20 to the error signal is disabled (timing chart (c)) by the operation of switch 76, and a constant dc drive signal is applied to translation stage 20 (timing chart (d)).

Subsequently, just prior to the occurrence of the disc index pulse, the tracking servo is totally disabled (timing chart (e)) by the operation of switch 82, and tracking mirror 28 is locked into its null, or straight-up, position (timing chart (f)). At the moment of occurrence of the disc index pulse, the record enable signal is enabled (timing chart (g)), and the recording of the new information begins immediately after the previously recorded data.

While the principles of the present invention have been demonstrated with particular regard to the illustrated structure of the figures, it will be recognized that various departures from such illustrative structure may be undertaken in practice of the invention. The scope of this invention is not intended to be limited to the structure disclosed herein but should instead be gauged by the breadth of the claims which follow.

What is claimed is:

1. In an information recording and playback system for use with a disc-shaped record medium having a convolution of spiral track recorded on a surface thereof, said convolution having recorded information stored thereon, and further having an unrecorded region of said surface abutting one end of said convolution, an apparatus for providing piecemeal recordings on said surface wherein a subsequent recording is made on said unrecorded region abutting one end of said convolution, said apparatus comprising:
    means for rotating said record medium;
    transducer means for detecting said information stored in said convolution;
    means for generating an error signal representative of the position of said transducer means relative to said convolution;
    means for effecting radial motion of said transducer means relative to said convolution;
    switch means for selectively applying, in a first position, said error signal to said means for effecting radial motion and, in a second position, a dc voltage level to said means for effecting radial motion; and
    means coupled to said transducer means and responsive to said information stored in said convolution for placing said switch means from said first position to said second position when said transducer means detects information stored near said end of said convolution abutting said unrecorded region, and responsive to said end of said convolution for initiating recording on said unrecorded region abutting said convolution.

2. The apparatus according to claim 1 wherein said means for effecting radial motion includes a translation stage which moves said transducer means such that said transducer means scans across said record medium in a radial direction.

3. The apparatus according to claim 1 wherein said means for placing said switch means from said first position to said second position includes processor means responsive to said information detected by said transducer means and switch control means responsive to a control signal generated by said processor means for controlling said switch means.

4. The apparatus according to claim 3 wherein said processor means responds to a predetermined pattern of said detected information and, after a predetermined time period following detection of said pattern, generates said control signal to said switch control means.

5. In an information recording and playback system for use with a disc-shaped record medium having a convolution of spiral track recorded on a surface thereof, said convolution having recorded information stored thereon, and further having an unrecorded region of said surface abutting one end of said convolution, an apparatus for providing a subsequent recording on said unrecorded region, said apparatus comprising:
    means for rotating said record medium;
    transducer means for detecting said information stored in said convolution;
    means for generating an error signal representative of the position of said transducer means relative to said convolution;
    means for effecting radial motion of said transducer means relative to said convolution, said motion effecting means including a translation stage and a galvanometer;

first switch means for selectively applying, in a first position a low frequency component of said error signal to said translation stage and, in a second position, a dc voltage level to said translation stage;

second switch means for selectively applying, in a first position, said error signal to said galvanometer and, in a second position, a null position signal to said galvanometer;

means coupled to said transducer means and responsive to said information stored in said convolution for placing said first and second switch means from their first positions to their respective second positions when said transducer means detects information stored near said end of said convolution abutting said unrecorded region, and responsive to said end of said convolution for initiating recording on said unrecorded region abutting said convolution.

6. The apparatus according to claim 5 wherein said translation stage moves said transducer means such that said transducer means scans across said record medium in a radial direction.

7. The apparatus according to claim 5 wherein said galvanometer further includes reflecting means which moves about an axis which is parallel to said surface of said record medium.

8. The apparatus according to claim 7 further including means responsive to said null position signal for causing said reflecting means of said galvanometer to be locked to a fixed position.

9. The apparatus according to claim 8 further including position detecting means responsive to the position of said galvanometer reflecting means for maintaining said reflecting means in said fixed position.

10. The apparatus according to claim 5 wherein said means for effecting radial motion further includes first and second drive means coupled, respectively, to said translation stage and said galvanometer.

11. The apparatus according to claim 10 wherein said means for generating an error signal further includes filtering means coupled between said transducer means and said first switch means to enable only a low frequency component of said error signal to be applied to said first drive means.

12. The apparatus according to claim 11 wherein said filtering means passes only signals of frequency less than 10 Hz.

13. The apparatus according to claim 5 wherein said means for placing said first and second switch means from said first positions to their respective second positions includes processor means responsive to said information detected by said transducer means and switch control means responsive to first and second control signals generated by said processor means for controlling said first and second switch means, respectively.

14. The apparatus according to claim 13 wherein said processor means responds to a predetermined pattern of said detected information and, after a first predetermined time period following detection of said pattern, generates said first control signal to said first switch means and, after a second predetermined time period following detection of said pattern, greater than said first predetermined time period, generates said second control signal to said second switch means.

15. The apparatus according to claim 14 wherein the information detected by said transducer means from said convolution following detection of said pattern and prior to said end of said convolution comprises clocking information, and said processor means generates said first control signal when said transducer means has detected approximately one-half of said clocking information.

16. The apparatus according to claim 15 wherein said processor means generates said second control signal when said transducer means has detected approximately nine-tenths of said clocking information.

17. The apparatus according to claim 5 wherein said translation stage responds to said dc voltage applied thereto to cause said transducer means to be moved with uniform velocity in a radial direction relative to said record medium.

18. In an information recording and playback system for use with a disc-shaped record medium having a convolution of spiral track recorded on a surface thereof, said convolution having recorded information stored thereon, and further having an unrecorded region of said surface abutting one end of said convolution, said system including means for rotating said record medium, transducer means for detecting said information stored in said convolution, means for effecting radial motion of said transducer means relative to said convolution, said motion effecting means including a translation stage and a galvanometer means, and means for detecting an index signal indicative of said end of said convolution; a method of initiating recording on said unrecorded region abutting said convolution comprising the following steps in the sequence set forth:

a. reading the information stored in said convolution;
b. applying a dc voltage to said translation stage at a predetermined time after said transducer means detects a pattern of information stored in said convolution indicating a first position near said end of said convolution;
c. locking said galvanometer means in a fixed position with respect to said record medium at a second larger predetermined time after said transducer means detects said pattern; and
d. terminating said reading and initiating recording on said unrecorded region abutting said convolution when detecting said index signal.

* * * * *